(12) United States Patent
Wang et al.

(10) Patent No.: US 7,724,813 B2
(45) Date of Patent: May 25, 2010

(54) METHOD AND APPARATUS FOR TRANSMIT POWER CONTROL

(75) Inventors: Yi-Pin Eric Wang, Cary, NC (US); Gregory Bottomley, Cary, NC (US); Lennart Andersson, Hjärnarp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1008 days.

(21) Appl. No.: 11/321,709

(22) Filed: Dec. 29, 2005

(65) Prior Publication Data

US 2006/0262840 A1 Nov. 23, 2006

Related U.S. Application Data

(60) Provisional application No. 60/683,203, filed on May 20, 2005, provisional application No. 60/723,587, filed on Oct. 4, 2005.

(51) Int. Cl.
*H04B 17/00* (2006.01)
*H04B 7/00* (2006.01)

(52) U.S. Cl. .................. 375/227; 455/67.13; 455/69

(58) Field of Classification Search .............. 375/147, 375/225, 227, 260, 340, 345, 346; 455/501, 455/67.11, 67.13, 69, 296
See application file for complete search history.

(56) References Cited

U.S. PATENT DOCUMENTS

| | | | |
|---|---|---|---|
| 5,758,271 A * | 5/1998 | Rich et al. ............... | 455/234.1 |
| 6,259,927 B1 | 7/2001 | Butovitsch et al. | |
| 6,493,541 B1 * | 12/2002 | Gunnarsson et al. .......... | 455/69 |
| 6,643,520 B1 | 11/2003 | Park et al. | |
| 2002/0125750 A1 | 9/2002 | Pavlov et al. | |
| 2002/0165004 A1 * | 11/2002 | Chen et al. ................. | 455/522 |
| 2003/0092447 A1 | 5/2003 | Bottomley et al. | |
| 2004/0259584 A1 * | 12/2004 | Murata et al. ............... | 455/522 |
| 2005/0009551 A1 * | 1/2005 | Tsai et al. .................. | 455/522 |
| 2005/0079887 A1 * | 4/2005 | Haim ......................... | 455/522 |

(Continued)

FOREIGN PATENT DOCUMENTS

EP 1467500 10/2004

(Continued)

OTHER PUBLICATIONS

Third Generation Partnership Project Working Group # 4., "Physical Channels and Mapping of Transport Channels Onto Physical Channels (FDD)." Technical Specification Group Radio Access Network TS 25.211, Mar. 2005, 50 pages, Version 6.7.0.

(Continued)

*Primary Examiner*—Young T. Tse
(74) *Attorney, Agent, or Firm*—Coats & Bennett, P.L.L.C.

(57) ABSTRACT

According to method and apparatus embodiments taught herein, power control feedback is generated for a control channel signal that is received in conjunction with a reference channel signal based on the reference channel's signal strength or quality, and an estimate of a gain factor relating the control and reference channel signals. By way of non-limiting example set in a Wideband CDMA (WCDMA) context, the reference channel signal comprises a Common Pilot Channel (CPICH) signal and the control channel signal comprises a Fractional Dedicated Physical Channel (F-DPCH) signal that is transmitted at an (unknown) power gain relative to the CPICH signal.

40 Claims, 7 Drawing Sheets

U.S. PATENT DOCUMENTS

2005/0089123 A1* 4/2005 Spiegel ................... 375/345
2005/0282500 A1* 12/2005 Wang et al. ............. 455/67.13
2006/0058055 A1* 3/2006 Shintani ................... 455/522
2006/0262754 A1* 11/2006 Andersson et al. .......... 370/332

FOREIGN PATENT DOCUMENTS

| JP | 2000-13247 A | 1/2000 |
| TW | 275282 B | 3/2007 |
| WO | 02/082686 A1 | 10/2002 |

OTHER PUBLICATIONS

Third Generation Partnership Project Working Group #4., "Physical Layer Procedures(FDD)." Technical Specification Group Radio Access Network TS 25.214, Jun. 2005, 60 pages, V6.7.1.

* cited by examiner

|  | FRAME $i$ | FRAME $i+1$ | | | | | | |
|---|---|---|---|---|---|---|---|---|
| SLOT NUMBER | $M$-1 | 0 | 1 | 2 | 3 | 4 | 5 | 6 |
| TARGET F-DPCH SINR (dB) | 3 | 3 | 3 | 3 | 3 | 3 | 3 | 3 |
| MEASURED CPICH SINR (dB) | 5 | 5 | 5 | 5 | 6 | 7 | 7 | 6 |
| GAIN FACTOR $\hat{\alpha}_i$ (dB) | -2.5 | | | | | | | |
| GAIN ADJUSTMENT VALUE, $g$ (dB) | 0 | 1 | 0 | 1 | 0 | -1 | -2 | -1 |
| ADJ. SIG. QUAL (dB) | 2.5 | 3.5 | 2.5 | 3.5 | 3.5 | 3.5 | 2.5 | 2.5 |
| MISALIGNMENT (dB) | -0.5 | 0.5 | -0.5 | 0.5 | 0.5 | 0.5 | -0.5 | -0.5 |
| TPC COMMAND (dB) | | + | − | + | − | − | − | + | + |

TIME

METHOD AND APPARATUS FOR TRANSMIT POWER CONTROL

RELATED APPLICATIONS

This application claims priority under 35 U.S.C. §119(e) from U.S. provisional patent application Ser. No. 60/683,203, filed on 20 May 2005 and entitled "Impact and Description of the F-DPCH," and from U.S. provisional patent application Ser. No. 60/723,587, filed on 4 Oct. 2005 and entitled "Methods for Determining TPC Commands for Power Controlling the Fractional Dedicated Physical Channel." These priority applications are expressly incorporated in their entireties by reference herein.

BACKGROUND

The present invention generally relates to transmit power control, and particularly relates to determining transmit power control feedback.

Transmit power control plays an important role in interference-limited communication networks, such as those based on Code Division Multiple Access (CDMA) technologies. Reliable communication and targeted levels of data throughput require transmission at sufficient power to insure adequate received signal quality, but transmitting at excess power is avoided as a mechanism to limit or otherwise reduce interference.

As one example of transmit power control, a first transceiver transmits an information signal to a second transceiver, and the second transceiver transmits power control feedback to the first transceiver as a function of received signal quality, as measured by the second transceiver for the information signal. In turn, the first transceiver increases or decreases transmit power for the information signal in response to the power control feedback. In this manner, the transmit power moves up and down, often within an allowable or otherwise bounded range, as needed to keep the received signal quality at the second transceiver at or about the targeted level over changing reception conditions.

Commonly, the power control feedback comprises Transmit Power Commands (TPCs) transmitted as 1s or −1s, depending on whether the measured signal quality is above or below a reference target. Such control often is referred to as "inner loop" power control and, as the term suggests, an "outer loop" power control mechanism often is paired with inner loop power control. With outer loop power control, one or more additional metrics, such as Bit Error Rate (BER) or Frame Error Rate (FER), or Block Error Rate (BLER), provide the basis for adjusting the inner loop target. That is, the inner loop power control generates TPCs by comparing measured signal quality to a target value, and outer loop power control adjusts the target value by comparing the additional metric(s) to corresponding target values, e.g., an FER or a BLER target of one percent.

Some contexts complicate the above approach to transmit power control. For example, the Wideband CDMA (W-CDMA) standards call out the use of downlink associated dedicated physical channels (ADPCHs) to send TPCs to user equipment (UE), to ensure that the UE transmits certain uplink control channels at transmit powers that result in the base stations receiving those channels at targeted signal qualities. For example, in the extension of W-CDMA systems denoted High Speed Downlink Packet Access (HSDPA), High Speed Dedicated Physical Control Channels (HS-DPCCHs) used by UE to signal Acknowledgement or Negative acknowledgement (ACK/NACK) for Hybrid automatic repeat request (H-ARQ) operation of the High Speed Downlink Shared Channel (HS-DSCH) generally are power-controlled by the network to ensure reliable reception by the supporting network base station(s). In turn, the UE returns TPCs to the transmitting network to ensure that the downlink TPCs are transmitted to the UE with sufficient power for reliable reception. In other words, the UE sends transmit power control feedback for the downlink power control channels to ensure that the UE receives the network-transmitted TPCs at a targeted signal quality.

Pilot information is included in the DPCH transmissions, e.g., one pilot symbol per time slot, and the receiving UE can use the received pilot information to estimate DPCH signal quality for generation of per-slot power control feedback. That is, the UE generates uplink TPC commands as feedback for the received DPCH by comparing downlink signal-to-noise-plus-interference ratio (SINR) measurements with a target SINR, which is set by the outer-loop power control.

However, to support greater numbers of HS-DSCH users without requiring additional downlink DPCHs for each user, the W-CDMA standards identify the use of "Fractional Dedicated Physical Channels" (F-DPCHs), which time multiplex a number of DPCHs for different UE onto one downlink channel. While this methodology consumes fewer spreading code resources on the downlink, it does complicate transmit power control at the UE because the F-DPCHs do not include per-slot pilot information on which UEs could base their signal quality estimation. Nor does the F-DPCH provide enough data symbols per slot to support accurate signal quality estimation from the received data symbols. Thus, as a non-limiting example, the F-DPCH exemplifies the type of channel that complicates inner/outer loop power control.

SUMMARY

According to method and apparatus embodiments taught herein, power control feedback is generated for a control channel signal that is received in conjunction with a reference channel signal based on the reference channel's signal strength or quality, and an estimate of a gain factor relating the control and reference channel signals. By way of non-limiting example set in a Wideband CDMA (WCDMA) context, the reference channel signal comprises a Common Pilot Channel (CPICH) signal and the control channel signal comprises a Fractional Dedicated Physical Channel (F-DPCH) signal that is transmitted at an (unknown) power gain relative to the CPICH signal. As such, the gain factor represents a calculated estimate of the unknown gain.

In one embodiment, a method of generating power control feedback for the control channel signal comprises calculating a gain factor relating the control and reference channel signals, determining an estimated signal quality or strength for the reference channel signal, and generating power control feedback for the control channel signal as a function of the estimated signal quality or strength and the gain factor. It will be understood that a power control circuit included in a wireless communication device can be configured to carry out the method based on a corresponding arrangement of hardware, software, or any combination thereof. By way of non-limiting example, the wireless communication device may comprise a mobile station, such as a cellular radiotelephone, or may comprise a wireless pager, a Portable Digital Assistant (PDA), a laptop or palmtop computer, or a communication module therein.

In at least one embodiment, the power control circuit is configured to calculate the gain factor at given times, to maintain an updated value for the gain factor between the given times, and to use the updated value for generation of the power control feedback. In one or more embodiments, maintaining the updated value for the gain factor comprises tracking changes in the gain factor corresponding to the power control feedback generated between the given times. For example, the power control circuit is configured to calculate the gain factor based on soft values for symbols received on the control channel signal over a given time interval, and based on net responses calculated from channel estimates made for the reference channel signal over the given time interval. That calculated value may be used as the starting value of the gain factor in a next interval and, during that next interval, the gain factor may be updated over the next interval according to the power control feedback being generated in that next interval.

If the gain factor is unavailable, the power control circuit in one embodiment generates the power control feedback for the control channel signal according to a predetermined sequence of power control commands—e.g., alternating up/down commands. The power control circuit can be configured to base its ongoing power control feedback generation in any given current time window or frame of the control channel signal on an updated value of the gain factor that depends on the value calculated for the gain factor in a prior frame, and on the power control feedback being generated in the current frame.

A new starting value of the gain factor can be calculated in each current frame for each next frame by collecting measurements over the current frame. For example, the power control circuit can be configured to calculate a value for the gain factor in a current frame based soft values for the symbols received on the control channel signal over the frame, and on net responses determined from channel estimates made for the reference channel signal over the frame. More generally, the recalculation of the gain factor can be performed at any given time, over any desired interval of the control channel signal, and an updated value of the gain factor can be maintained between recalculations based on tracking ongoing power control feedback generation.

In one embodiment, the power control circuit is configured to generate the power control feedback as power control commands, such as uplink power control commands generated on a per-slot basis for the control channel signal. Each uplink power control command—e.g., up, down, or hold—is generated by comparing an adjusted signal quality to a target signal quality. For example, if the adjusted signal quality is above the target, a down command is generated. Conversely, if the adjusted signal quality is below the target signal quality, an up command is generated. The adjusted signal quality is obtained by adjusting an estimated signal quality determined from the reference channel signal, e.g., a per-slot estimate, as a function of the updated value of the gain factor.

In another embodiment, the uplink power control commands are generated in similar fashion, but using a misalignment value that is compared to a misalignment target threshold. The misalignment value is, in one embodiment, an updated misalignment value based on an initial misalignment determined from a starting value of the gain factor and a corresponding estimate of the reference channel signal quality, and ongoing misalignment updates that track subsequent changes in reference channel signal quality and changes in the gain factor corresponding to uplink power control command generation.

In all such embodiments, the generation of uplink transmit power control commands may be considered as "inner" loop power control, and the power control circuit is configured in one or more embodiments to run an "outer loop" power control mechanism that adjusts one or more of the values used by the inner loop as a function of one or more performance metrics that reflect the performance of ongoing inner loop power control. For example, values that may be adjusted include any one or more of the gain factor, the estimated signal quality, the target signal quality, the misalignment value, and the misalignment target threshold. One such performance metric is a Command Error Rate (CER) estimate that may be calculated by the power control circuit.

Of course, the present invention is not limited to the above features and advantages. Those skilled in the art will recognize additional features and advantages upon reading the following detailed description, and upon viewing the accompanying drawings.

BRIEF DESCRIPTION OF THE DRAWINGS

FIG. 8 is a diagram of example values for the processing logic of FIG. 5 or 7.

DETAILED DESCRIPTION

Figure 1:
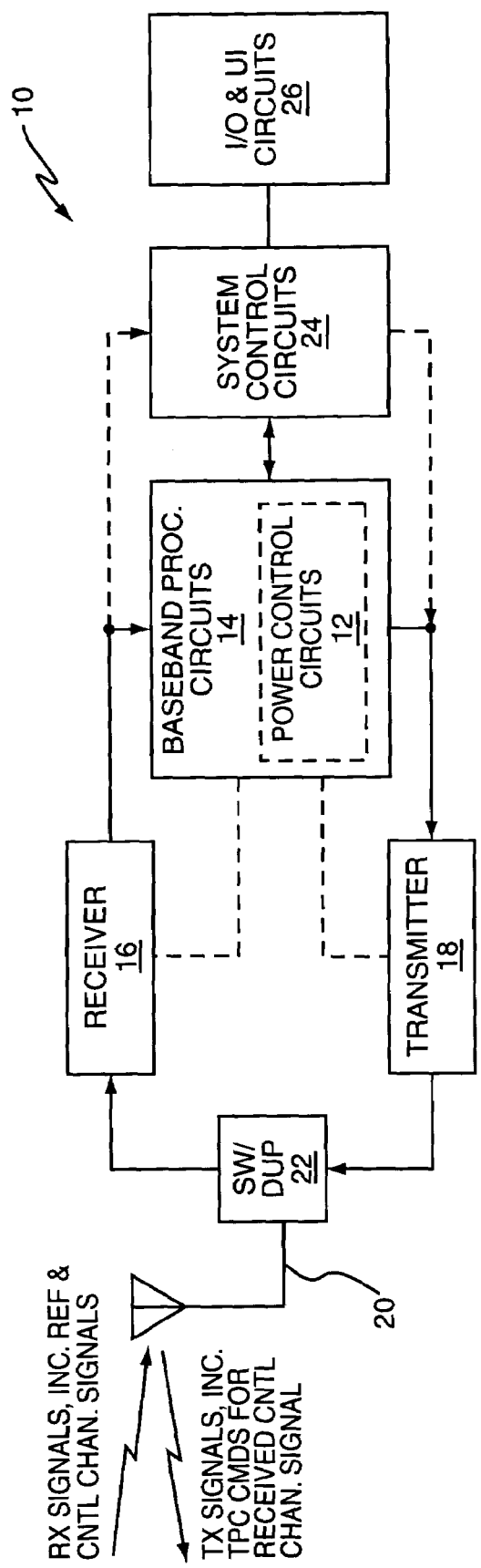
FIG. 1 is a block diagram of one embodiment of a wireless communication device, including one embodiment of a power control circuit according to methods and apparatuses taught herein.

FIG. 1 illustrates one embodiment of a wireless communication device 10 that includes a power control circuit 12 that is configured to generate power control feedback for a received control (or data) channel signal based on a received reference channel signal. While its implementation will vary according to its intended use, the illustrated embodiment of the wireless communication device 10 further comprises one or more baseband processing circuits 14, a receiver circuit 16 and a transmitter circuit 18 that are coupled to one or more antennas 20 via a switch/duplexer 22, one or more system control circuits 24, and one or more input/output (I/O) and user interface (UI) circuits 26.

In more detail, it may be assumed that the control channel signal should be received by the wireless communication device 10 at a signal quality sufficient to ensure reliable reception of the control channel information, and is further assumed that the control channel signal does not readily support direct, reliable signal quality estimation over the time frames of interest. For example, the control channel signal may be transmitted at an unknown transmit power gain to the reference channel signal, and may not carry pilot or reference information known a priori on which signal quality estimation could be based, or may not have a high enough data rate to support reliable data-based signal quality estimation over the time frames of interest. However, it is assumed that the reference channel signal readily supports signal quality estimation. For example, the reference channel signal may comprise a pilot signal having a pilot symbol rate sufficient for reliable signal quality estimation over the time frames of interest.

By way of a non-limiting example set in the context of a W-CDMA-based communication network, the reference channel signal may be a Common Pilot Channel (CPICH) signal, and the control channel signal may be a Fractional Dedicated Physical Channel (F-DPCH) signal transmitted at a given transmit power gain relative to the CPICH—the gain offset generally is unknown to the receiving mobile devices. The F-DPCH is used to send (downlink) power control commands to individual ones in a plurality of mobile stations, for the purpose of controlling the uplink transmit powers of those mobile stations. As such, it is important that the mobile stations receive the incoming downlink power control commands at a signal quality sufficient to ensure reliable reception of the command values going to each mobile station. To this end, a mobile station receiving power control commands on the F-DPCH must generate power control feedback—uplink Transmit Power Control (TPC) commands—to ensure that the downlink power control commands being sent to the mobile station on F-DPCH are received at the targeted signal quality. In this context, the power control feedback method taught herein generates power control feedback for the F-DPCH signal based on the CPICH signal and an estimated gain factor representing the transmit power gain of the F-DPCH relative to the CPICH signal.

More broadly, according to power control feedback generation as taught herein, the power control circuit 12 of the wireless communication device 10 generates power control feedback for the control channel signal based on the reference channel signal. That is, the power control circuit 12 generates power control commands for controlling the transmit power of the control channel signal based on estimates of the gain factor relating the control and reference channel signals and measurements of the reference channel signal quality or strength. (It should be understood that the power control circuit 12 can be equivalently configured to use reference channel signal strength rather than an explicit estimate of reference channel signal quality. Unless otherwise noted, where signal quality operations are specified herein, signal strength operations also are contemplated.)

The above operations may be considered as comprising an initialization phase and a stabilization phase. In the initialization phase, an estimate of the gain factor is unavailable and the power control circuit 12 generates power control feedback according to other means. For example, it may be configured to generate power control feedback according to a predetermined sequence of power control commands, such as a series of alternating up/down commands, or as a series of hold commands, if hold commands are defined. Alternatively, the power control circuit 12 may be configured to generate power control feedback based on potentially rough estimates of control channel signal quality. For example, a noise power estimate may be obtained through taking the absolute values square of RAKE (or G-RAKE) outputs for symbol values received on the control channel signal to obtain a signal quality estimate. Regardless, while such initialization-phase power control feedback generation is ongoing, the power control circuit 12 collects measurements, such as measurements of received control channel symbols and (reference) channel estimates, and uses the measurements to estimate the gain factor.

In stabilization phase operations, the power control circuit 12 generates power control feedback for the control channel signal based on the gain factor estimate and measured reference signal strength or quality. Further, during stabilization phase operations, the power control circuit 12 keeps the gain factor updated such that it tracks ongoing power control feedback generation. That is, the gain factor is adjusted up and down as needed, to reflect the changes in control channel signal transmit power corresponding to the power control feedback being generated for that channel by the wireless communication device 10.

In at least one embodiment, the control channel signal comprises repeating frames, with each frame comprising a plurality of slots, and the power control circuit is configured to generate a power control command for the control channel signal during each slot. With this channel timing and structure in mind, the power control circuit 12 generates per-slot Transmit Power Control (TPC) commands for controlling control channel signal transmit power during the initialization phase using a predetermined command sequence, or using potentially rough measurements of control channel signal quality. Once the gain factor estimate is available, power control feedback generation can transition to stabilization phase operation.

In stabilization phase operation, the power control circuit 12 generates per-slot power control feedback for the control channel signal based on the gain factor estimate and per-slot measurements of reference channel signal quality or strength. As part of this process, the power control circuit 12 updates the gain factor as a function of its per-slot power control command generation. That is, as up or down commands are generated from slot-to-slot, the power control circuit 12 increments and decrements the gain factor, as appropriate, to account for the corresponding changes in control channel signal transmit power.

Such adjustments may be based on the assumption that the (remote) transmitter faithfully follows the power control feedback being returned by the wireless communication device 10, or may be based on an estimation process that accounts for deviations in the power control feedback process. For example, the power control circuit 12 can be configured to estimate what the remote transmitter actually does in response to the uplink power control commands being returned by the wireless communication device according to the teachings of U.S. Published Patent Application 2003/0092447 ("'447") to Bottomley et al., filed on 1 Oct. 2005. The '447 application is incorporated by reference herein.

In at least one embodiment of stabilization phase operation, measurements are collected in each frame of the control channel signal to calculate a new estimate of the gain factor for use in the next frame, e.g., a starting value of the gain factor to be used at the beginning of the next frame. Thus, per-slot power control generation in a current frame begins with the gain factor estimate from the prior frame and adjusts during the current frame according to reflect power control feedback generation ongoing in the current frame. Of course, variations of this embodiment are contemplated, such as where one or more frames are used to calculate a gain factor, which is then used in more than one succeeding frame as the basis for power control feedback generation.

In such embodiments, the original value of the gain factor is adjusted up and down across the successive frames to track the power control commands being generated. As tracking may not be perfect, gain factor estimation error may accumulate between recalculations and the number of frames between recalculation of the gain factor may be set accordingly. More generally, as detailed later herein, power control feedback generation as taught herein contemplates one or more mechanisms to reduce or eliminate the accumulation of errors, such as by reverting to the initialization phase from time to time, or by recalculating the gain factor on a regular basis, e.g., frame-to-frame.

Irrespective of such slot/frame and error reduction details, one embodiment of the power control feedback generation method taught herein generates power control feedback for the control channel signal by comparing an adjusted signal quality or strength to a corresponding target threshold. Using signal strength as an example, the power control circuit 12 is configured to obtain an estimated signal strength from the reference channel signal, and to obtain an adjusted signal strength by adjusting the estimated signal strength as a function of the current value of the gain factor. This adjusted signal strength effectively represents an indirect but accurate measurement of control channel signal strength and, thus, the power control circuit 12 generates an up/down (or hold) power control command for the control channel signal by comparing the adjusted signal strength to a target signal strength, which may be multiplied by a measurement of noise. The gain factor is then updated to reflect the power control command generated by the comparison.

Figure 2:
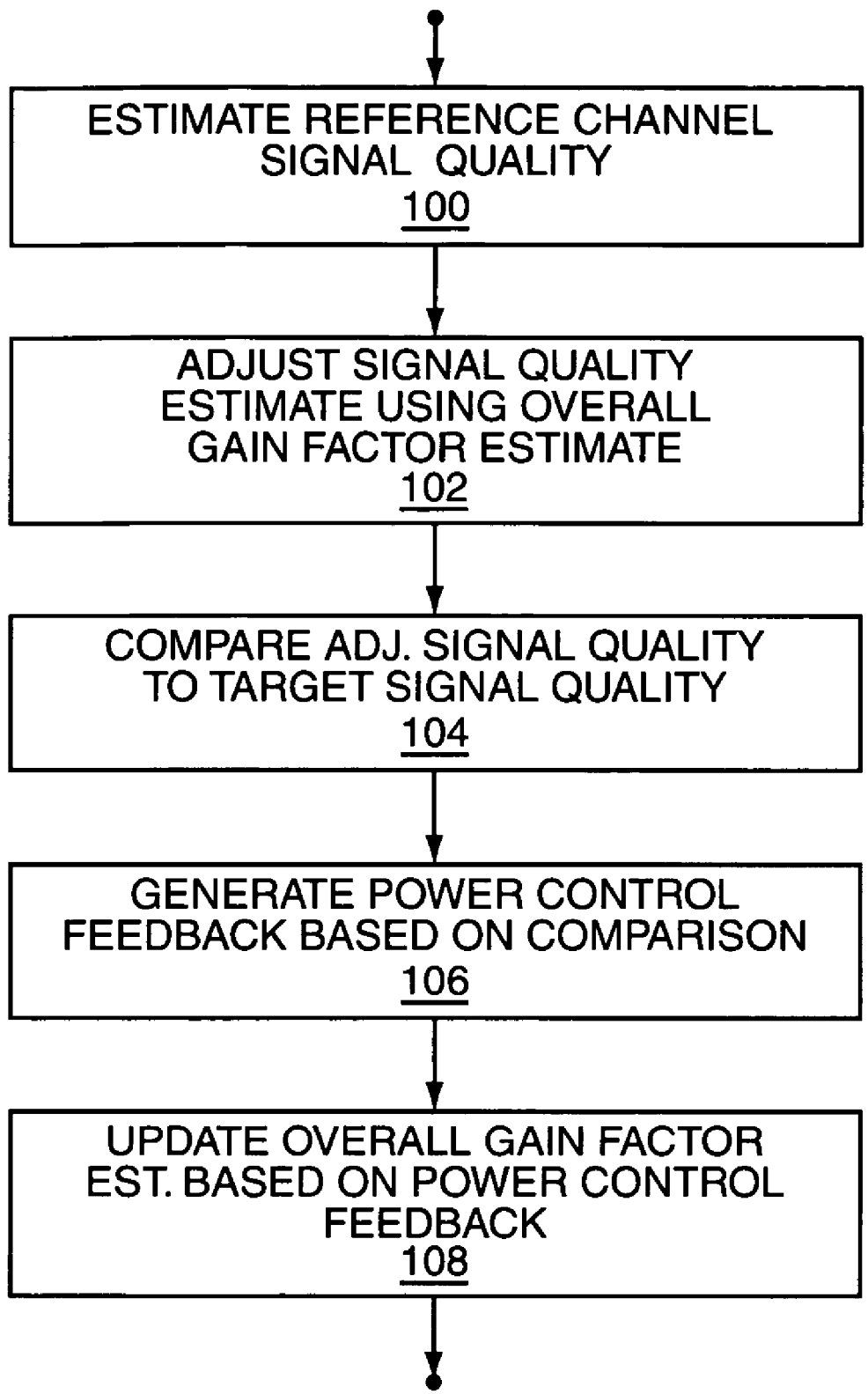
FIG. 2 is a logic flow diagram of one embodiment of processing logic that may be implemented by the wireless communication device of FIG. 1.
Figure 3:
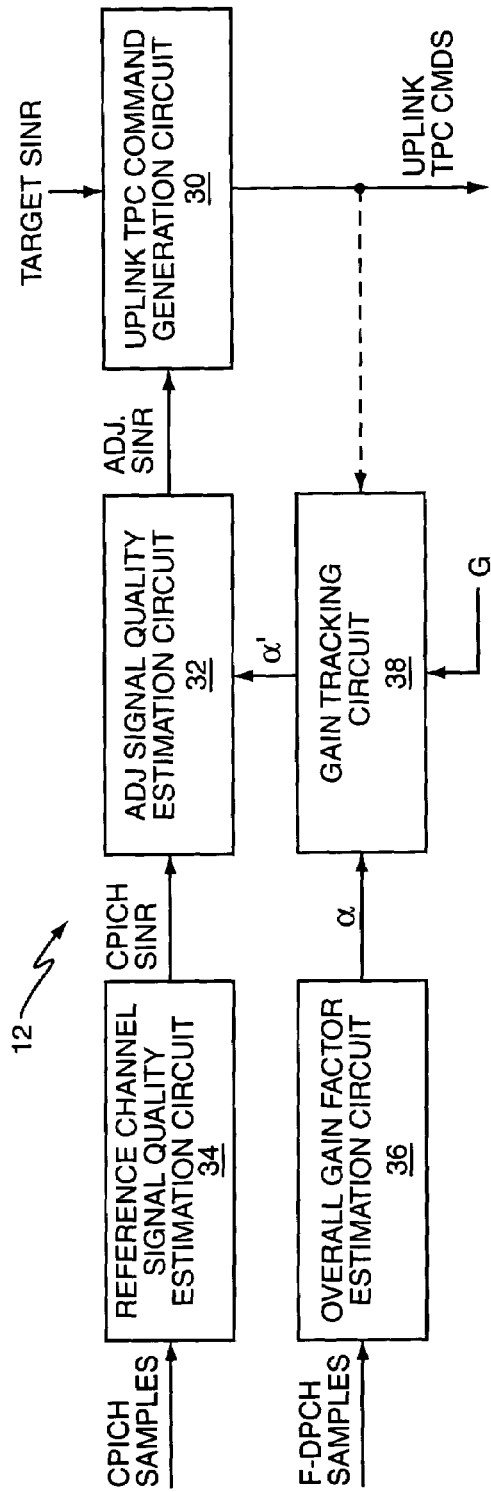
FIG. 3 is a block diagram of one embodiment of the power control circuit shown in FIG. 1.

The same operations can be performed using estimated and adjusted signal qualities. For example, Steps 100-108 of FIG. 2 illustrate one embodiment of processing logic based on signal qualities, and FIG. 3 illustrates a corresponding functional arrangement for the one or more processing circuits comprising the power control circuit 12. It should be understood that the illustration may or may not represent physical circuit implementations, depending, for example, on whether the power control circuit 12 is implemented in hardware or software, or in some combination thereof. For example, in a software-based implementation, the illustrated circuit elements may comprise processing functions implemented by stored computer program instructions, or microcode, etc.

For the illustrated embodiment, the power control circuit 12 comprises an uplink TPC command generation circuit 30, an adjusted signal quality estimation circuit 32, a reference channel signal quality estimation circuit 34, a gain factor estimation circuit 36, and a gain tracking circuit 38, which can be incorporated within the gain factor estimation circuit 36.

In the context of generating an uplink TPC command at a desired time, such as for a current slot of the control channel signal, the uplink TPC command generation circuit 30 compares an adjusted signal quality to a target signal quality. Signal-to-interference-plus-noise ratios (SINRS) may be used in the comparison. The interference plus noise may comprise all impairments in the system, such as inter cell interference, intra cell interference and thermal noise. In at least one embodiment, if the adjusted signal quality is below the target signal quality, the uplink TPC command generation circuit 30 outputs an up command (e.g., a "1"). If the adjusted signal quality is above the target signal quality, the uplink TPC command generation circuit 30 generates a down command (e.g., a "−1"). In some embodiments, hold commands also are generated.

The adjusted signal quality represents the reference channel signal quality estimate output by the reference channel signal quality estimation circuit 34, as adjusted by the gain factor $\alpha'$ output by the gain tracking circuit 38. For example, $\alpha'$ can be incremented upward by the value G in response to the generation of an up power control command or decremented downward by G in response to the generation of a down power control command. Note, too, that gain tracking increments may use a value $G_{up}$ and gain tracking decrements may use a value $G_{down}$. In general, the gain tracking adjustments should track the corresponding incremental changes in transmit power being made by the remote transmitter for the control channel signal.

In any case, the gain factor $\alpha'$ is a dynamically updated version of the gain factor estimate $\alpha$, as generated by the gain factor estimation circuit 36. The value of $\alpha$ can be calculated based on measurements made over a window of time for the control channel signal. Then $\alpha'$ is set equal to $\alpha$ at the beginning of the next window and is dynamically adjusted over that next window in response to the ongoing generation of uplink TPC commands. Generalizing such logic, in any current window, measurements can be collected during the current window, so that a new value for $\alpha$ can be calculated for use in the next window.

Figure 4:
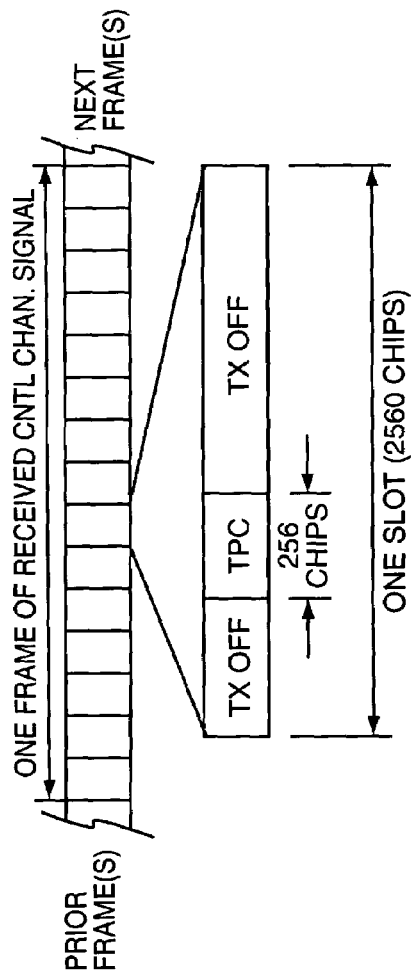
FIG. 4 is a diagram of one frame of a control channel signal as may be received by the wireless communication device of FIG. 1.

Also, note that the value of $\alpha$ and/or $\alpha'$ can be reset, or otherwise recalculated from time to time, as mentioned earlier herein. For example, FIG. 4 illustrates an embodiment where the control channel signal comprises an F-DPCH signal having repeating frames, where each frame comprises a number of slots. The frame/slot structure of the control channel signal may be used to drive recalculation of the gain factor $\alpha$.

Figure 5:
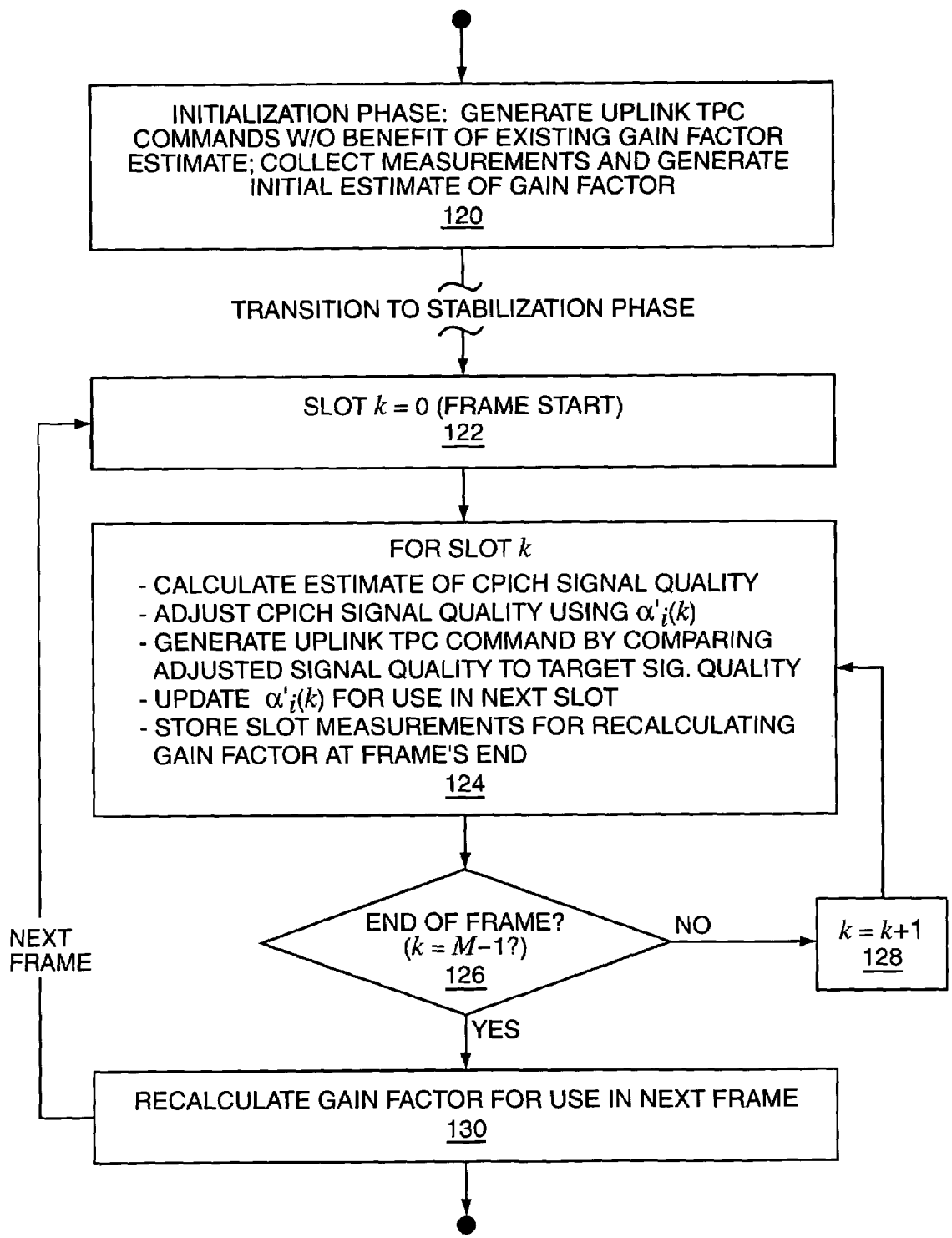
FIG. 5 is a logic flow diagram of one embodiment processing logic that may be implemented by the power control circuit of FIG. 3, for example.

FIG. 5 illustrates one embodiment of power control feedback generation logic that complements the frame/slot structure of the control channel signal illustrated in FIG. 4.

Processing begins in an initial frame of the F-DPCH signal, wherein the power control circuit 12 generates transmit power control commands without benefit of having an estimate of the gain factor, using either rough signal quality estimates, or using predetermined power control command sequences (Step 120). Also during this initial phase, the power control circuit 12 generates an initial estimate of the gain factor, which may be used as the starting value for the gain factor in the first frame of the stabilization phase. Processing continues assuming that the power control circuit 12 transitions to the stabilization phase and Steps 122 through 130 illustrate per-frame/per-slot processing for any i th frame of the F-DPCH during stabilization phase processing. Thus, for the start of the i th frame, the frame slot index k is set to zero (Step 122).

For each slot k in the i th frame, where k={0, ..., M−1}, where M is the number of slots in a frame, the power control circuit 12 calculates an estimate of CPICH signal quality (e.g., CPICH SINR); adjusts the CPICH signal quality based on $\alpha'_i(k)$, which represents the dynamically updated value of the gain factor in slot k; generates the uplink TPC command for the slot by comparing the adjusted signal quality to the target signal quality; updates $\alpha'_i(k)$ for use in the next slot; and collects/stores slot-specific measurements for recalculation of the gain factor at frame's end (Step 124).

If it is not the end of the current frame (k≠M−1) (Step 126), the slot index k is incremented (Step 128), and the actions of Step 124 are repeated for the next slot. If it is the end of the current frame(k=M−1), the gain factor is recalculated for use in the next frame (Step 130). Doing so prevents the carryover of gain tracking errors across frames. Of course, in some environments, such errors may be minimal and the gain factor is not recalculated at the end of each frame.

Figure 6:
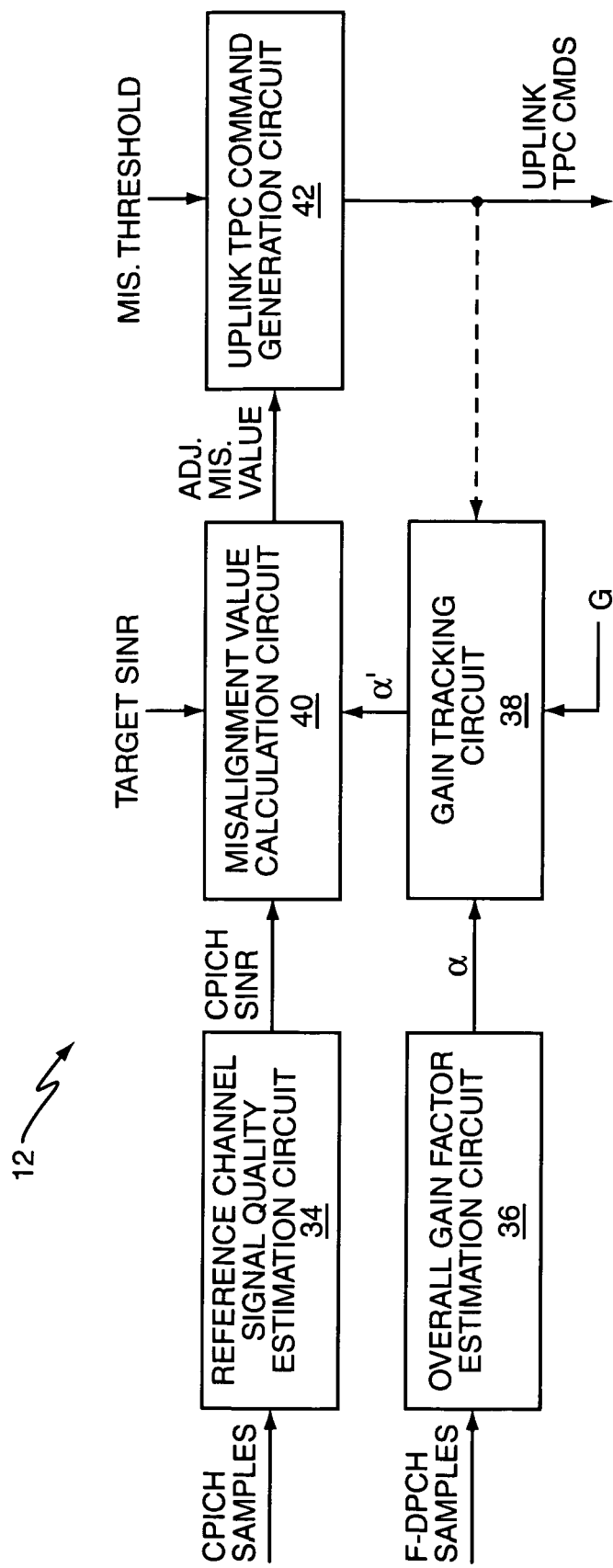
FIG. 6 is a block diagram of one embodiment of the power circuit control shown in FIG. 1.
Figure 7:
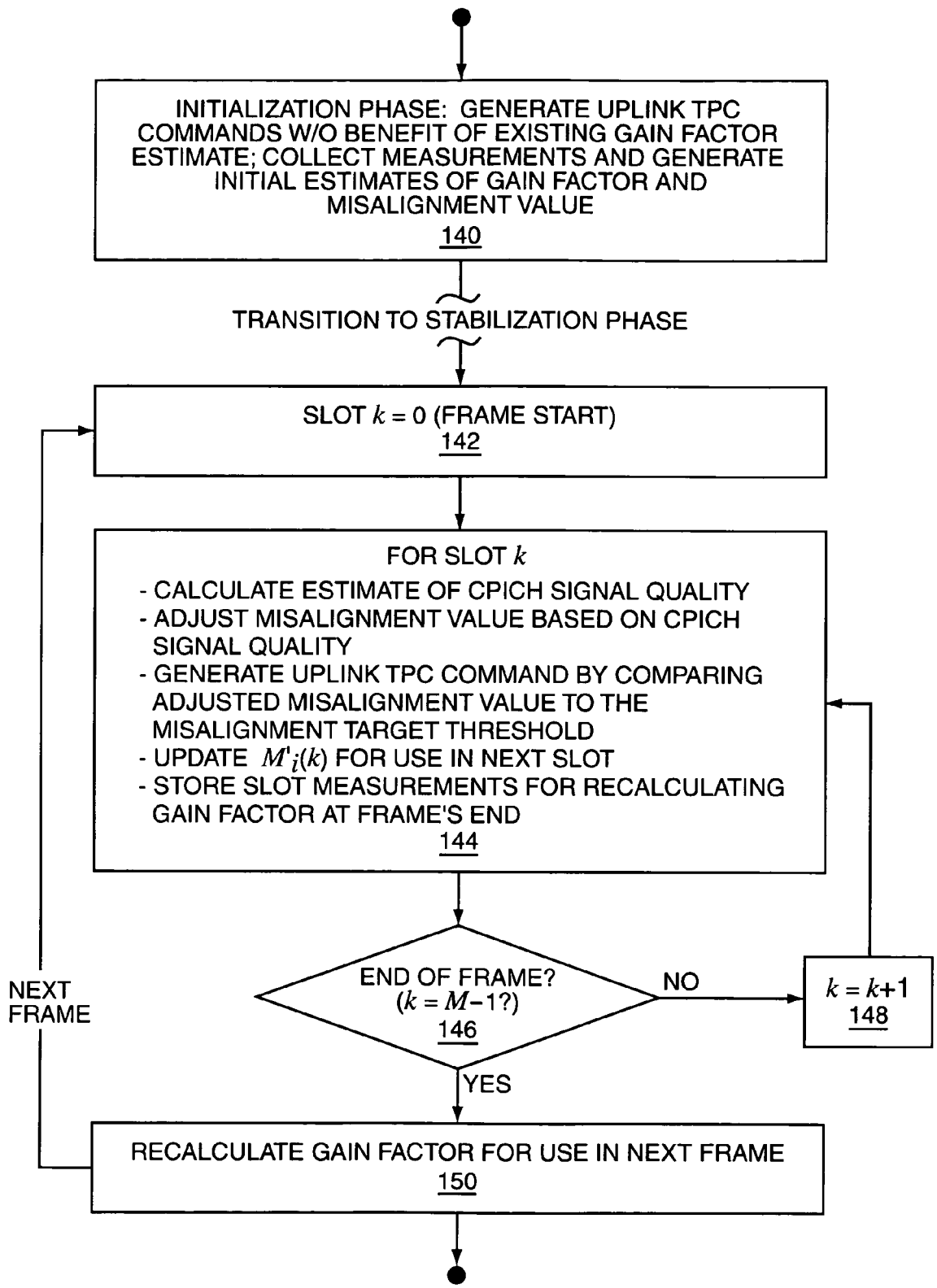
FIG. 7 is a logic flow diagram of one embodiment processing logic that may be implemented by the power control circuit of FIG. 6, for example.

FIG. 6 illustrates another functional circuit embodiment for the power control circuit 12, and FIG. 7 illustrates an embodiment of corresponding processing logic. As with the circuits and associated processing of FIGS. 3 and 5, respectively, the circuits and processing of FIGS. 6 and 7 may be used to generate power control feedback on a per-slot basis within frames of a received control channel signal and, more broadly, for any given interval of interest in the received control channel signal.

Rather than using an adjusted signal quality as the basis for uplink TPC command generation, the power control circuit 12 of FIG. 6 includes a misalignment value calculation circuit 40 that calculates and maintains a misalignment value reflecting the delta between a target signal quality and estimated signal quality, and further includes an uplink TPC command generation circuit 42 that is configured to generate uplink TPC commands by comparing the misalignment value to a misalignment target threshold.

With these circuits in mind, processing begins in FIG. 7 in an initialization phase (Step 140), wherein the power control circuit determines initial gain factor and misalignment value estimates, which can be used in at least the first frame after transitioning to the stabilization phase. Assuming that operation has transitioned to the stabilization phase, for the start of the i th frame, the frame slot index k is set to zero (Step 142).

For each slot k in the i th frame, the power control circuit 12 calculates an estimate of CPICH signal quality (e.g., CPICH SINR); adjusts the misalignment value $m'_i(k)$ to account for changes in measured CPICH signal quality; generates the uplink TPC command for the slot by comparing the adjusted misalignment value to a misalignment target threshold; updates the misalignment value $m'_i(k)$ for use in the next frame; and collects/stores slot-specific measurements for recalculation of the gain factor at frame's end (Step 144). If it is not the end of the current frame (k≠M−1) (Step 146), the slot index k is incremented (Step 148), and the actions of Step 144 are repeated for the next slot. If it is the end of the current frame(k=M−1), the gain factor is recalculated for use in the next frame (Step 150). Optionally, the gain factor is not recalculated every frame and gain tracking is carried across frames.

To better understand the above embodiments, the gain factor in slot k=0 of frame i is given as $\alpha'_i(0) = \hat{\alpha}_{i-1}$, where $\hat{\alpha}_{i-1}$ represents the estimate of the gain factor $\alpha_{i-1}$, as calculated in the prior frame i−1. Then, in any subsequent slot k of frame i, the value of $\alpha'_i(k)$ in linear units is given as $$\alpha'_i(k) = \hat{\alpha}_{i-1} G^{\sum_{j=0}^{k-1} TPC_j} \quad \text{(Eq. 1)}$$

where G represents the incremental decrease or increase in transmit power associated with the uplink TPC command generated in slot k. G is typically referred to as the power control step size. In logarithmic units (dBs), the above value may be expressed as $$(\alpha'_i(k))_{dB} = (\hat{\alpha}_{i-1})_{dB} + (G)_{dB} \sum_{j=0}^{k-1} TPC_j \quad \text{(Eq. 2)}$$

Thus, in any given slot of the current frame, the value of $\alpha'_i(k)$ equals the value of $\hat{\alpha}_{i-1}$ plus or minus the accumulated effect of TPC commands generated in the previous slots of the current frame. One mathematically convenient approach to maintaining α' across slots in the current frame is simply to increment or decrement it in each slot as a function of the TPC command generated in the prior slot. For example, after generation of the TPC command in the current slot, the gain factor in slot k can be updated for use in slot k+1 as $\alpha'_i(k+1) = \alpha'_i(k)/G$ or $\alpha'_i(k+1) = \alpha'_i(k)G$, which provides an increment or decrement in logarithmic units, with +/−G dBs.

Regardless of the particular approach chosen for maintaining the gain factor across the current frame, it is useful to describe one embodiment for collecting measurements across the frame to support recalculating the gain factor for use in the next frame. As a non-limiting example, the receiver circuit 16 and/or the receiver processing portion of the baseband processing circuits 14 operate as a RAKE receiver and the RAKE output, i.e., the soft value of the control channel symbol received in the k th slot of the i th frame of the control channel signal can be expressed as $$z_i(k) = \alpha'_i(k) c_i(k) \hat{u}_i(k) + n_i(k) \quad \text{(Eq. 3)}$$

where $c_i(k)$ is based on the net response determined from the reference channel and combining weights, $\hat{u}_i(k)$ is a hard decision symbol value for the received symbol, and $n_i(k)$ is a noise sample. Note that the net response accounts for transmitter pulse waveform, radio channel, and receive filter response. Also, note that gain factor $\alpha'_i(k)$ may be maintained in two parts: a baseline estimate of the overall gain factor, such as the $\hat{\alpha}_{i-1}$ estimate from the prior frame; and a gain adjustment value $g_i(k)$ that tracks ongoing power control command generation slot-to-slot within frame i. For example, $$\alpha'_i(k) = \hat{\alpha}_{i-1} g_i(k) \quad \text{(Eq. 4)}$$

The value of $g_i(k)$ can be maintained as $$g_i(k) = G^{\sum_{j=0}^{k} \beta_i(j)} \quad \text{(Eq. 5)}$$

where G is the downlink power control step size and $\beta_i(j)$ is the uplink TPC command generated by the wireless communication device 10 during the jth slot of the ith frame. The value of G may be set to a nominal value. For example, G may have the value 1.122, which corresponds to a 1 dB step. Alternatively, the value of G can be estimated by observing the RAKE receiver outputs between consecutive slots.

With (Eq. 4) in mind, (Eq. 3) may be expressed as $$z_i(k) = \hat{\alpha}_{i-1} g_i(k) c_i(k) \hat{u}_i(k) \quad \text{(Eq. 6)}$$

The received control channel symbol is first demodulated and collected for use in generating a baseline overall gain factor $\alpha_i$ for use in frame i+1. The product of $g_i(k)$, $c_i(k)$, and $\hat{u}_i(k)$, which is expressed as $$v_i(k) = g_i(k) c_i(k) \hat{u}_i(k) \quad \text{(Eq. 7)}$$

is known, assuming that the gain adjustment value $g_i(k)$ follows the uplink TPC commands being generated and transmitted by the wireless communication device 10. To prevent error propagation due to uplink TPC command reception errors or the transmitting base station otherwise not following the uplink TPC commands being generated by the wireless communication device 10, the gain adjustment value $g_i(k)$ can be reset to 1 during the last slot of every frame, i.e., $g_i(M-1) = 1$, where M is the number of slots per frame.

Collecting $z_i(k)$, $v_i(k)$ and $n_i(k)$ from all slots in the current frame into a vector $$z_i = \alpha v_i + n_i \quad \text{(Eq. 8)}$$

The least-squares (LS) estimate of the gain factor $\alpha_i$ for the current frame i based on (Eq. 8) can be expressed as $$\hat{\alpha}_i = \frac{\text{Re}(v_i^H z_i)}{|v_i|^2}. \quad \text{(Eq. 9)}$$

It can be shown that the estimator in (Eq. 9) is also a minimum mean-square error (MMSE) estimator. In any case, the starting gain factor value, $\alpha'_i(k=0)$, in frame i can be set to the value obtained from (Eq. 9) in frame i−1, and then $\alpha'_i(k)$ is updated over successive slots. Alternatively, in the context of (Eq. 4), the running value of the gain factor in any slot k of frame i is given as $$\alpha'_i(k) = \hat{\alpha}_{i-1} g_i(k) \quad \text{(Eq. 10)}$$

Regardless, the gain factor $\hat{\alpha}_{i-1}$ from frame i−1 provides the basis for SINR estimation in frame i. For example, if RAKE or Generalized RAKE (G-RAKE) combining is used, the symbol SINR for the downlink TPC symbol received in slot k of frame i of the control channel signal is $$\hat{\gamma}_i(k) = \frac{\hat{\alpha}_{i-1}^2 g_i^2(k) w^H h h^H w}{w^H R w} \quad \text{or} \quad \text{(Eq. 11)}$$

$$\hat{\gamma}_i(k) = \frac{\alpha'_i(k) w^H h h^H w}{w^H R w} \quad \text{(Eq. 12)}$$

where w is the combining weight, h is the net response and R is the covariance matrix for impairments from different fingers of a RAKE or G-RAKE combiner. Estimates of h and R can be obtained from measurements made for the received reference channel signal. For CPICH and F-DPCH signals, the power offset between them during the last slot of the previous frame is folded into the value $\hat{\alpha}_{i-1}$. Also note that $$\frac{w^H h h^H w}{w^H R w}$$

corresponds to the CPICH symbol SINR. If G-RAKE combining is used, that term simplifies to $$\hat{\gamma}_i(k) = \hat{\alpha}_{i-1}^2(k) h^H R^{-1} h. \quad \text{(Eq. 13)}$$

or $$\hat{\gamma}_i(k) = \alpha'_i(k) h^H R^{-1} h \quad \text{(Eq. 14)}$$

Again, $h^H R^{-1} h$ corresponds to CPICH symbol SINR and may be estimated directly from measurements of the received CPICH signal.

As a concrete example of the above embodiments, one may refer to FIG. 8, where the target signal quality for a F-DPCH signal is set at 3 dB. For the last slot M−1 of frame i, the gain factor $\hat{\alpha}_{i-1}$ as computed in the prior frame is −2.5 dB, and the gain adjustment value $g_i(M-1)$ is reset to 0 dB. Thus, the adjusted signal quality for uplink TPC command generation is determined by adding $\hat{\alpha}_{i-1}$ and $g_i(M-1)$ to the CPICH signal quality measured for slot M−1 of frame i, which equals equals 5 dB+(−2.5) dB+0 dB. As such, the adjusted signal quality, which represents an approximation of the actual F-DPCH signal quality, is 2.5 dB. Comparing that value to the target signal quality of 3 dB means that the uplink TPC command is generated as a (+), to indicate that the network transmitter should increase the transmit power of the F-DPCH.

Moving to the next frame, processing begins for slot 0 of frame i+1 with an updating of the gain adjustment value $g_{i+1}(0)$ to a value of 1 dB, to reflect the just-generated (+) TPC command value. Assuming that the measured signal quality for the CPICH in slot 0 of frame i+1 still is 5 dB, the adjusted signal quality=5 dB+(−2.5)+1 dB=3.5 dB. Comparing this value to the target signal quality value of 3 dB, the uplink TPC command generated for the 0th slot is a (−) value, indicating that the transmit power of the F-DPCH signal should be reduced. This process is repeated for the succeeding slots of frame i+1.

FIG. 8 also can be understood as illustrating power control command generation in embodiments based on using signal quality misalignment values. At the beginning of frame i+1, the misalignment value would be initialized from the last slot of the previous frame to the CPICH SINR (5 dB) plus the gain factor (−2.5 dB) minus the target F-DPCH SINR (3 dB), giving an initial signal quality misalignment value of −0.5 dB. During slot 0, this value would be incremented by the change in CPICH SINR (0 dB) and the effect of the previous TPC command (+1 dB), giving a signal quality misalignment value of 0.5 dB. As this value is positive, a down command would be generated between slots 0 and 1 as shown in FIG. 7. Similarly, in slot 1, the misalignment value would be updated to −0.5 dB and an up command would be generated. In slot 2, the misalignment value would be 0.5 dB and a down command would be generated. In slot 3, the misalignment value would be adjusted by the change in CPICH SINR (+1 dB) and the previous TPC (−1 dB), giving 0.5 dB and causing another down command. In slot 4, the same thing would occur as in slot 3.

Regardless of whether adjusted signal quality or misalignment is used in power control feedback generation, estimates of the downlink symbols received on the control channel signal are used during the estimation of the gain factor. For example, it is common to use maximum-likelihood (ML) based detection for detecting F-DPCH symbols. A noise realization with a smaller magnitude is assumed more likely to happen than a noise realization with a larger magnitude. Using ML detected symbols in SINR estimation may result in a bias of under-estimating the noise variance. This bias can be accounted for in the method taught herein. For example, a constant bias can be applied to the estimated F-DPCH SINR. Alternatively, one can avoid this bias by taking the magnitude square at the RAKE combiner output before further averaging or smoothing. From (Eq. 6) for example, the magnitude square of the RAKE combiner output of the kth slot in the ith frame is $$|z_i(k)|^2 = \hat{\alpha}_{i-1}^2 g_i^2(k) |c_i(k)|^2 + |n_i(k)|^2 + 2\alpha \text{Re}\{n_i^*(k) y_i(k)\}. \quad \text{(Eq. 15)}$$

Averaging over the frame slots, an estimate of the gain factor in frame i can be obtained as follows $$\hat{\alpha}_i = \sqrt{\frac{\sum_{k=0}^{M-1} |z_i(k)|^2 - \hat{I}}{\sum_{k=0}^{M-1} g_i^2(k) |c_i(k)|^2}} \quad \text{(Eq. 16)}$$

where $\hat{I}$ is the estimate of noise-plus-interference power, which can be estimated separately from the received CPICH signal.

In the example of FIG. 8, the inner-loop power control of F-DPCH has stabilized during the M−1 slot of frame i, so that F-DPCH SINR is within a step size to the target SINR. Note that this need not be the case. Continuing the example, to determine the uplink TPC command during slot 4 of frame i+1, the wireless communication device 10 estimates the CPICH symbol SINR as 7 dB. Comparing this latest CPICH SINR to that of slot M−1 in the prior frame i (where the stabilization phase is achieved), there is a +2 dB increase. Then, counting the "up" commands and the "down" uplink TPC commands generated by the wireless communication device 10 between slot M−1 in frame i and the previous slot in the current frame (i.e., slot 3 of frame i+1), there are two "up" commands and three "down" commands, indicating that the transmit power of F-DPCH has been reduced by 1 dB. (This indication is based on the assumption that the uplink TPC commands were properly received and acted on by the network transmitter responsible for transmitting the F-DPCH signal to the wireless communication device 10.)

Because the gain in CPICH SINR is more than the assumed reduction in F-DPCH transmit power, the uplink TPC command to be generated in slot 4 of frame i+1 has to be a "down" value. Notably, while the adjusted signal quality used to determine uplink TPC command generation represents an estimate of the actual F-DPCH signal quality, this method of transmit power control does not require any explicit estimate of F-DPCH symbol SINR. That is, the adjusted signal quality represents an indirect but accurate estimate of F-DPCH signal quality that can be compared to a F-DPCH target signal quality. (Equivalently, a misalignment value can be compared to a corresponding misalignment target threshold.)

Whether adjusted signal quality or misalignment values are used, the comparison of a calculated quality or misalignment to a target on a per-slot basis represents an "inner loop" power control mechanism, wherein the wireless communication device 10 generates a succession of up or down (or hold) commands by comparing the adjusted signal quality or strength, or the misalignment value, to a corresponding threshold. The wireless communication device 10 may be configured further to carry on "outer loop" power control, wherein it adjusts the target threshold according to some performance metric.

For example, the downlink commands received on the control channel signal can be used to estimate a Command Error Rate (CER), which can be used as a basis for outer-loop power control adjustment of the target threshold by the wireless communication device 10. Alternatively, or additionally, the CER or another performance metric can be used to adjust any one or more of the gain factor, the misalignment value estimate, or the reference channel signal quality estimate.

For example, if the estimated CER is higher than a target CER, then the gain factor $\hat{\alpha}_i$ can be adjusted downward, to reflect the fact that the effective signal quality of the received F-DPCH signal is lower than indicated by the ongoing determination of adjusted signal quality. CER-based adjustment of the gain factor $\hat{\alpha}_i$ may be based on, for example, a 1 dB step size. The gain factor $\hat{\alpha}_i$ would then remain the same until it was recalculated or until a new CER was estimated.

As another example, the target signal quality against which the adjusted signal quality is compared can be adjusted as a function of CER estimation. That is, if the estimated CER exceeds the target CER value, the target signal quality could be adjusted upward, by 1 dB for example. Conversely, if the estimated CER is below the target CER value, the target signal quality could be adjusted downward by 1 dB. As a further alternative, the target signal quality could be adjusted up "A" dB, where A equals some numeric value, when the estimated CER is too large. Then, every so often (without necessarily measuring CER), the target signal quality would be dropped "B" dB, where B is numeric value commonly made smaller in magnitude than A. At some point, the CER is again estimated and compared to the target CER. If the estimated CER exceeds the target CER, another jump up would be taken for the target signal quality. Conversely, if the estimated CER is lower than the target CER, the target signal quality would be lowered by B dB. These same "jump" based approaches could, in the alternative, be applied to the misalignment value estimate and/or to the gain factor $\hat{\alpha}_i$.

In looking at CER estimation in the context of an F-DPCH signal on which downlink TPC commands are received, the relevant standards specify that TPC symbols are transmitted as same-valued bit pairs. Thus, the two bits received in each downlink TPC symbol should be the same and, if the bit values are not the same, a reception error for the given TPC symbol can be assumed.

Therefore, a beginning point in the analysis of CER determination for the F-DPCH begins with noting that two different TPC command symbols are possible, but the underlying symbol modulation is the same for both command symbols. Thus, the TPC command symbols can be expressed as $$u = u_o \cdot TPC \qquad \text{(Eq. 17)}$$

where $TPC \in \{-1, 1\}$ is the TPC command (where −1 represents a logical down and vice versa) and the base (unsigned) modulation symbol is $$u_o = \frac{(1+i)}{\sqrt{2}}. \qquad \text{(Eq. 18)}$$

The received TPC commands (i.e., the received TPC symbols) can be estimated using maximum ratio combining (MRC) as $$TPC_{est} = \text{sign}\left(\text{Re}\left(u_o^* \sum_{f=1}^{N_f} \frac{\hat{y}_f \hat{h}_f^*}{\hat{I}_f}\right)\right) \qquad \text{(Eq. 19)}$$

where $\hat{h}_f$ and $\hat{I}_f$ may be estimated from the CPICH. The individual TPC symbol bits, $TPC_r$ and $TPC_i$ can be estimated as $$TPC_{est,r} = \text{Re} \sum_{f=1}^{N_f} \frac{\hat{y}_f \hat{h}_f^*}{\hat{I}_f} \qquad \text{(Eq. 20)}$$

and $$TPC_{est,i} = \text{Im} \sum_{f=1}^{N_f} \frac{\hat{y}_f \hat{h}_f^*}{\hat{I}_f}. \qquad \text{(Eq. 21)}$$

Further, both transmitted bits in each TPC symbol are, by definition, equal. Thus, each estimated TPC symbol may be expressed as $$TPC_{est} = \text{sign}(Re(u_o^* \cdot (TPC_{est,r} + i \cdot TPC_{est,i}))) \qquad \text{(Eq. 22)}$$

where both $\hat{h}_f$ and $\hat{I}_f$ are estimated based on the CPICH. Note that the MRC is a special form of G-RAKE combining, which could also be used.

Within the above analytical framework, it may be shown that an additive white Gaussian noise (AWGN) map between the SINR and CER is relatively channel independent, making it possible to directly map the CER target to an SINR target. (Note, too, that the AWGN map obviously is valid for an AWGN channel, but also is a good approximation for other types of channels.) More particularly, assuming that $\hat{h}_f$ and $\hat{I}_f$ are good approximations of $h_f$ and $I_f$, it may be realized that $$TPC_{est} = \text{sign}(TPC+n) \qquad \text{(Eq. 23)}$$

where $$n = \text{Re}\left(\frac{u_o^* \cdot \sum_f \frac{h_f^* e_f}{I_f}}{g \cdot \sum_f \frac{|h_f|^2}{I_f}}\right) \qquad \text{(Eq. 24)}$$

The TPC command error rate (CER) therefore may be expressed as $$CER = \frac{1}{2} \cdot P(|n| > 1) = P(n > 1) \qquad \text{(Eq. 25)}$$

and the variance of n (assuming uncorrelated finger noise) is given by $$E(n^2) = \frac{1}{2\left(g^2 \cdot \sum_f \frac{|h_f|^2}{I_f}\right)} = \frac{1}{2 \cdot E_s/N_o} \qquad \text{(Eq. 26)}$$

Thus, with (Eq. 26), the CER is given as a function of SINR ($E_s/N_o$), and one sees that this functional mapping may be used to identify a target SINR for inner loop power control that corresponds to the desired (target) CER. That is, with knowledge that the two bits of each power control command received on the F-DPCH signal are by definition equal, the probability that a command with unequal bits will be received can be converted to a CER estimate according to a probability-to-CER function. This approach is based on the realization that the relationship between the probability of receiving unequal command bits and the CER is relatively channel independent.

Assuming that the noise on the two estimated soft TPC bits in a given received power control command is uncorrelated, then the probability that the two estimated hard bits are unequal, $TPC_r$, $TPC_i \in \{1, -1\}$ is given by $$\zeta = P(TPC_r \neq TPC_i) \qquad \text{(Eq. 27)}$$

$$= \frac{SIR}{\pi} \int_{x_1=-\infty}^{0} e^{\frac{-(x_1-1)\cdot SIR}{2}} dx_1 \cdot \int_{x_2=0}^{\infty} e^{\frac{-(x_2-1)\cdot SIR}{2}} dx_2$$

where $SIR=E_b/N_o$ is the SINR of the estimated TPC bits, and where the variables $x_1$ and $x_2$ represent received TPC bits in a given power control command. The CER is thus given by $$CER = \frac{SIR}{2\pi} \int_{x_1=-\infty}^{0} \int_{x_2=-\infty}^{-x_1} e^{\frac{-(x_1+x_2-2)\cdot SIR}{2}} dx_1 dx_2 \qquad \text{(Eq. 28)}$$

A suitable polynomial approximation of the probability-to-CER mapping function is given as $$CER_{est} = 2.31 \cdot \zeta^3 + 0.141 \cdot \zeta - 4.91 \cdot 10^{-3} \qquad \text{(Eq. 29)}$$

where the command reception error probability for unequal TPC bits can be estimated as $$\hat{\zeta}_k = \lambda \cdot \hat{\zeta}_{k-1} + (1-\lambda)\frac{1}{2}|TPC_r - TPC_i| \qquad \text{(Eq. 30)}$$

and where $\lambda \in [0,1]$ is a filter constant (for an exponential weighting filter). For W-CDMA applications, a suitable value is $\lambda=0.99$ corresponding to a time constant of 100 slots, which complements the expected occurrence of between ten and thirty reception errors (unequal TPC command bits) during this time constant. That frequency of reception error occurrence generally should be enough for good CER estimation performance.

The co-pending and commonly assigned patent application Ser. No. 11/296,560, which was filed on 7 Dec. 2005, and which is entitled "Method and Apparatus for Communication Channel Error Rate Estimation," is incorporated in its entirety herein by reference. The interested reader may refer to that application for further details regarding CER estimation and related mapping details.

Of further note, the proposed method of determining uplink TPC commands for the F-DPCH or, more generally, for any received control or data channel of interest, can be further used to estimate the average bit-error-rate (BER) for the channel of interest. For example, during the beginning phase of F-DPCH power control, the estimated F-DPCH SINRs $\hat{\gamma}_i(k)$ may be available and thus may be used to estimate the average BER of the received F-DPCH signal. Then, during the stabilization phase, the wireless communication device 10 could use the present CPICH SINR and the accumulated uplink TPC commands from a reference slot to determine the F-DPCH symbol SINR.

As an example, the F-DPCH symbol SINR for slot 4 of frame i+1 in FIG. 8 can be inferred as 1 dB higher than the F-DPCH SINR of slot M−1 in frame i (the reference slot), because the gain in CPICH SINR has been 1 dB more than the reduction in F-DPCH transmit power since slot M−1 of frame i. As the F-DPCH symbol SINR is 2.5 dB in slot M−1 of frame i, the F-DPCH symbol SINR is estimated as 3.5 dB for slot 4 of frame i+1.

The estimated F-DPCH symbol SINR can be mapped to an estimated F-DPCH bit-error-rate (BER), $e_i(k)$. For example, $$e_i(k) = \frac{1}{2}\text{erfc}\left(\sqrt{\hat{\gamma}_i(k)}\right) \qquad \text{(Eq. 31)}$$

where erfc denotes the complementary error function and the SINR, $\gamma$, is in linear units. The SINR to BER mapping can further account for the wireless communication device's implementation margin, e.g., $$e_i(k) = \frac{1}{2}\text{erfc}\left(\sqrt{\hat{\gamma}_i(k)/L}\right),$$

where L is the implementation loss.

Regardless, the average BER for the ith F-DPCH frame can be obtained by $$BER(i) = \frac{1}{M}\sum_{k=0}^{M-1} e_i(k) \qquad \text{(Eq. 32)}$$

With the above range of applications and embodiments in mind, it should be understood that the present invention is not limited by the foregoing description, nor is it limited by the accompanying drawings. Instead, the present invention is limited only by the following claims, and their legal equivalents.

What is claimed is:

1. A wireless communication device configured to receive reference and control channel signals, said wireless communication device including a power control circuit configured to generate power control feedback for the control channel signal based on estimating signal quality or strength of the reference channel signal and estimating a gain factor relating the control and reference channel signals.

2. The wireless communication device of claim 1, wherein the power control circuit comprises a signal quality estimation circuit to generate an estimated signal quality for the reference channel signal, a gain factor estimation circuit to calculate the gain factor, and a gain tracking circuit to track gain factor changes arising from ongoing generation of the power control feedback.

3. The wireless communication device of claim 2, wherein the power control circuit further comprises a signal quality adjustment circuit to maintain an adjusted signal quality by adjusting the estimated signal quality as a function of the gain factor and the gain factor changes, and an uplink power control command generation circuit to generate uplink power control commands based on comparing the adjusted signal quality to a target signal quality.

4. The wireless communication device of claim 3, wherein the power control circuit is configured to estimate a Command Error Rate (CER) for commands received on the control channel signal as a performance metric for ongoing generation of the power control feedback, and is further configured to compare the CER to a target CER and adjust any one or more of the target signal quality, the gain factor, and the estimated signal quality, based on said comparison.

5. The wireless communication device of claim 2, wherein the power control circuit further comprises a misalignment value circuit to calculate an initial misalignment value as a function of the estimated signal quality and the gain factor and maintain an updated misalignment value as a function of the estimated signal quality changes and the gain factor changes, and an uplink power control command generation circuit to generate uplink power control commands based on comparing the updated misalignment value to a misalignment target threshold.

6. The wireless communication device of claim 5, wherein the power control circuit is configured to estimate a Command Error Rate (CER) for commands received on the control channel signal as a performance metric for ongoing generation of the power control feedback, and is further configured to compare the CER to a target CER and adjust any one or more of the misalignment target threshold, the initial or updated misalignment value, the gain factor, and the estimated signal quality, based on said comparison.

7. The wireless communication device of claim 1, wherein the power control circuit is configured to recalculate the gain factor at given times, and to maintain an updated value for the gain factor between those given times by tracking the generation of the power control feedback occurring between those given times.

8. The wireless communication device of claim 1, wherein the control channel signal is organized as repeating frames, with each frame having a plurality of slots, and wherein the power control circuit is configured to generate the power control feedback for the control channel signal in a current frame of the control channel signal by generating an uplink power control command in each slot of the current frame as a function of an updated value of the gain factor and a per-slot estimate of reference channel signal quality or strength.

9. The wireless communication device of claim 8, wherein the power control circuit is configured to maintain the updated value for the gain factor over the plurality of slots in the current frame by setting the gain factor to a starting value calculated in a prior frame of the control channel signal, and further by tracking per-slot changes to the starting value corresponding to the uplink power control commands being generated over successive slots in the current frame.

10. The wireless communication device of claim 9, wherein the power control circuit is configured, for any given current frame, to calculate a starting value for the gain factor in a next frame based on soft values received on the control channel signal over the current frame, and net responses generated from channel estimates made for the reference channel signal over the current frame.

11. The wireless communication device of claim 1, wherein the power control circuit is configured to estimate the gain factor as a function of measurements made over a given time interval, such that the power control circuit operates in an initialization phase at least before a first such time interval is completed, wherein the power control circuit generates the power control feedback for the power control channel during the initialization phase according to a predetermined power control command sequence.

12. The wireless communication device of claim 1, wherein the wireless communication device is configured according to Wideband Code Division Multiple Access (W-CDMA) standards, and wherein the reference channel signal comprises a Common Pilot Channel (CPICH) signal and the control channel signal comprises a Fractional Dedicated Physical Channel (F-DPCH) signal.

13. A method in a wireless communication device of generating power control feedback for a control channel signal received in conjunction with a reference channel signal, the method comprising:
calculating a gain factor relating the control and reference channel signals;
determining an estimated signal quality or strength for the reference channel signal; and
generating the power control feedback for the control channel signal as a function of the estimated signal quality or strength and the gain factor.

14. The method of claim 13, further comprising generating the power control feedback for the control channel signal according to a predetermined sequence of power control commands if the gain factor is unavailable.

15. The method of claim 13, wherein calculating the gain factor relating the control and reference channel signals comprises calculating the gain factor at given times, maintaining an updated value for the gain factor between the given times, and using the updated value for generation of the power control feedback.

16. The method of claim 15, wherein maintaining the updated value for the gain factor between the given times comprises tracking changes in the gain factor corresponding to the power control feedback generated between the given times.

17. The method of claim 13, wherein calculating the gain factor relating the control and reference channel signals comprises calculating the gain factor based on soft values for symbols received on the control channel signal over a given time interval, and based on net responses calculated from channel estimates made for the reference channel signal over the given time interval.

18. The method of claim 13, wherein generating the power control feedback for the control channel signal as a function of the estimated signal quality or strength and the gain factor "comprises obtaining" since the removed limitation has been recited in the precedent claim 13 an adjusted signal quality by adjusting the estimated signal quality based on the gain factor, and generating an uplink power control command by comparing the adjusted signal quality to a target signal quality.

19. The method of claim 18, further comprising updating the gain factor as a function of the uplink power control command generated by said comparison, such that the gain factor tracks changes in a gain of the control channel signal corresponding to the uplink power control command being generated by a power control circuit.

20. The method of claim 18, further comprising estimating a Command Error Rate (CER) for commands received on the control channel signal as a performance metric for ongoing generation of the power control feedback, comparing the CER to a target CER, and adjusting any one or more of the target signal quality, the gain factor, and the estimated signal quality, based on said comparison.

21. The method of claim 13, wherein generating the power control feedback for the control channel signal as a function of the estimated signal quality or strength and the gain factor "comprises calculating" since the removed limitation has been recited in the precedent claim 13 an initial misalignment value as a function of the estimated signal quality, the gain factor, and a target signal quality, maintaining an updated misalignment value by tracking changes in the estimated signal quality and the gain factor, and generating uplink power control commands by comparing the updated misalignment value to a misalignment target threshold.

22. The method of claim 21, further comprising estimating a Command Error Rate (CER) for commands received on the control channel signal as a performance metric for ongoing generation of the power control feedback, comparing the CER to a target CER, and adjusting any one or more of the misalignment target threshold, the initial or updated misalignment value, the gain factor, and the estimated signal quality, based on said comparison.

23. The method of claim 13, further comprising recalculating the gain factor at given times, and maintaining an updated value for the gain factor between those given times by tracking generation of the power control feedback occurring between those given times.

24. The method of claim 13, wherein the control channel signal is organized as repeating frames, with each frame having a plurality of slots, and wherein generating the power control feedback for the control channel signal comprises generating an uplink power control command in each slot of a current frame as a function of an updated value of the gain factor and a per-slot estimate of reference channel signal quality or strength.

25. The method of claim 24, further comprising determining the per-slot estimate of reference channel signal quality or strength as a per-slot estimated signal quality, and wherein calculating the gain factor relating the control and reference channel signals comprises maintaining the updated value for the gain factor across successive slots of the current frame as a function of the uplink power control commands being generated in those successive slots.

26. The method of claim 25, further comprising setting the gain factor to a starting value calculated in a prior frame of the control channel signal, such that maintaining the updated value for the gain factor comprises tracking per-slot changes to the starting value corresponding to the uplink power control commands being generated over successive slots in the current frame.

27. The method of claim 26, further comprising calculating the starting value of the gain factor for a next frame based on soft values of symbols received on the control channel signal over the current frame, and net responses generated from channel estimates made for the reference channel signal over the current frame.

28. The method of claim 13, wherein the reference channel signal comprises a Common Pilot Channel (CPICH) signal and the control channel signal comprises a Fractional Dedicated Physical Channel (F-DPCH) signal.

29. A power control circuit for use in a wireless communication device configured to receive reference and control channel signals, said power control circuit comprising one or more processing circuits that are configured to generate power control feedback for the control channel signal based on estimating signal quality or strength of the reference channel signal and estimating a gain factor relating the control and reference channel signals.

30. The power control circuit of claim 29, wherein the power control circuit comprises a signal quality estimation circuit to generate an estimated signal quality for the reference channel signal, a gain factor estimation circuit to calculate the gain factor, and a gain tracking circuit to track gain factor changes arising from ongoing generation of the power control feedback.

31. The power control circuit of claim 30, wherein the power control circuit further comprises a signal quality adjustment circuit to maintain an adjusted signal quality by adjusting the estimated signal quality as a function of the gain factor and the gain factor changes, and an uplink power control command generation circuit to generate uplink power control commands based on comparing the adjusted signal quality to a target signal quality.

32. The power control circuit of claim 31, wherein the power control circuit is configured to estimate a Command Error Rate (CER) for commands received on the control channel signal as a performance metric for ongoing generation of the power control feedback, and is further configured to compare the CER to a target CER and adjust any one or more of the target signal quality, the gain factor, and the estimated signal quality, based on said comparison.

33. The power control circuit of claim 30, wherein the power control circuit further comprises a misalignment value circuit to calculate an initial misalignment value as a function of the estimated signal quality and the gain factor and maintain an updated misalignment value as a function of the estimated signal quality changes and the gain factor changes, and an uplink power control command generation circuit to generate uplink power control commands based on comparing the updated misalignment value to a misalignment target threshold.

34. The power control circuit of claim 33, wherein the power control circuit is configured to estimate a Command Error Rate (CER) for commands received on the control channel signal as a performance metric for ongoing generation of the power control feedback, and is further configured to compare the CER to a target CER and adjust any one or more of the misalignment target threshold, the initial or updated misalignment value, the gain factor, and the estimated signal quality, based on said comparison.

35. The power control circuit of claim 29, wherein the power control circuit is configured to recalculate the gain factor at given times, and to maintain an updated value for the gain factor between those given times by tracking the generation of the power control feedback occurring between those given times.

36. The power control circuit of claim 29, wherein the control channel signal is organized as repeating frames, with each frame having a plurality of slots, and wherein the power control circuit is configured to generate the power control feedback for the control channel signal in a current frame of the control channel signal by generating an uplink power control command in each slot of the current frame as a function of an updated value of the gain factor and a per-slot estimate of reference channel signal quality or strength.

37. The power control circuit of claim 36, wherein the power control circuit is configured to maintain the updated value for the gain factor over the plurality of slots in the current frame by setting the gain factor to a starting value calculated in a prior frame of the control channel signal, and further by tracking per-slot changes to the starting value corresponding to the uplink power control commands being generated over successive slots in the current frame.

38. The power control circuit of claim 37, wherein the power control circuit is configured, for any given current frame, to calculate a starting value for the gain factor in a next frame based on soft values received on the control channel signal over the current frame, and net responses generated from channel estimates made for the reference channel signal over the current frame.

39. The power control circuit of claim 29, wherein the power control circuit is configured to estimate the gain factor as a function of measurements made over a given time interval, such that the power control circuit operates in an initialization phase at least before a first such time interval is completed, wherein the power control circuit generates the power control feedback for the power control channel during the initialization phase according to a predetermined power control command sequence.

40. The power control circuit of claim 29, wherein the wireless communication device is configured according to Wideband Code Division Multiple Access (W-CDMA) standards, and wherein the reference channel signal comprises a Common Pilot Channel (CPICH) signal and the control channel signal comprises a Fractional Dedicated Physical Channel (F-DPCH) signal.

* * * * *

UNITED STATES PATENT AND TRADEMARK OFFICE
CERTIFICATE OF CORRECTION

PATENT NO. : 7,724,813 B2
APPLICATION NO. : 11/321709
DATED : May 25, 2010
INVENTOR(S) : Wang et al.

It is certified that error appears in the above-identified patent and that said Letters Patent is hereby corrected as shown below:

In Column 7, Line 47, delete "(SINRS)" and insert -- (SIRNs) --, therefor.

In Column 10, Line 43, in Equation (6), delete " $z_i(k) = \hat{\alpha}_{i-1} g_i(k) c_i(k) \hat{u}_i(k)$ " and insert -- $z_i(k) = \hat{\alpha}_{i-1} g_i(k) c_i(k) \hat{u}_i(k) + n_i(k)$ --, therefor.

In Column 10, Line 64, in Equation (8), delete "$z_i = \alpha v_i + n_i$." and insert -- $z_i = \alpha v_i + n_i$. --, therefor.

In Column 11, Lines 3-4, in Equation (9), delete " $\hat{\alpha}_i = \frac{Re(v_i^H z_i)}{|v_i|^2}$. " and insert -- $\hat{\alpha}_i = \frac{Re(v_i^H z_i)}{|v_i|^2}$. --, therefor.

In Column 11, Lines 23-24, in Equation (11), delete " $\hat{\gamma}_i(k) = \frac{\hat{\alpha}_{i-1}^2 g_i^2(k) w^H h h^H w}{w^H R w}$ " and insert -- $\hat{\gamma}_i(k) = \frac{\hat{\alpha}_{i-1}^2 g_i^2(k) w^H h h^H w}{w^H R w}$ --, therefor.

In Column 11, Lines 25-26, in Equation (12), delete " $\hat{\gamma}_i(k) = \frac{\alpha_i'(k) w^H h h^H w}{w^H R w}$ " and insert -- $\hat{\gamma}_i(k) = \frac{\alpha_i'(k) w^H h h^H w}{w^H R w}$ --, therefor.

In Column 11, Line 29, delete "w" and insert -- w --, therefor.

In Column 11, Line 29, delete "h" and insert -- h --, therefor.

In Column 11, Line 29, delete "R" and insert -- R --, therefor.

In Column 11, Line 31, delete "h and R" and insert -- h and R --, therefor.

In Column 11, Lines 38-40, delete " $\frac{w^H h h^H w}{w^H R w}$ " and insert -- $\frac{w^H h h^H w}{w^H R w}$ --, therefor.

Signed and Sealed this

Sixteenth Day of November, 2010

David J. Kappos
*Director of the United States Patent and Trademark Office*

CERTIFICATE OF CORRECTION (continued)
U.S. Pat. No. 7,724,813 B2

In Column 11, Line 45, in Equation (13), delete " $\hat{\gamma}_i(k)=\hat{\alpha}_{i-1}{}^2(k)h^H R^{-1}h.$ " and insert -- $\hat{\gamma}_i(k) = \hat{\alpha}_{i-1}^2 g_i^2(k)\mathbf{h}^H \mathbf{R}^{-1}\mathbf{h}.$ --, therefor.

In Column 11, Line 48, in Equation (14), delete " $\hat{\gamma}_i(k)=\alpha'_i(k)h^H R^{-1}h$ " and insert -- $\hat{\gamma}_i(k) = \alpha'_i(k)\mathbf{h}^H \mathbf{R}^{-1}\mathbf{h}$ --, therefor.

In Column 11, Line 50, delete "h$^H$R$^{-1}$h" and insert -- $\mathbf{h}^H\mathbf{R}^{-1}\mathbf{h}$ --, therefor.

In Column 11, Line 60, after "which" delete "equals".

In Column 18, Line 24, in Claim 9, delete "a" and insert -- the --, therefor.

In Column 19, Lines 22-23, in Claim 18, delete ""comprises obtaining" since the removed limitation has been recited in the precedent claim 13" and insert -- comprises obtaining --, therefor.

In Column 19, Lines 43-44, in Claim 21, delete ""comprises calculating" since the removed limitation has been recited in the precedent claim 13" and insert -- comprises calculating --, therefor.